Aug. 30, 1960  A. R. WELLS  2,951,136
DUAL CALIBRATION THERMOSTAT (HOT CASING)
Filed July 29, 1958

INVENTOR.
ALTON R. WELLS
BY
Oldham & Oldham
ATTYS.

United States Patent Office 2,951,136
Patented Aug. 30, 1960

2,951,136

DUAL CALIBRATION THERMOSTAT
(HOT CASING)

Alton R. Wells, 235 Edgerton Road, Akron, Ohio

Filed July 29, 1958, Ser. No. 751,734

6 Claims. (Cl. 200—113)

The present invention relates to thermostats, and especially to a small, compact thermostat having two thermostate control arms therein for controlling a pair of circuits connected thereto and usually having a conductive casing forming part of a thermostate control circuit.

Previously there have been various types of thermostats produced and one style of a thermostat, which has had good commercial acceptance, is that construction shown in U.S. Patent No. 2,586,309 wherein a pair of bi-metal arms are provided and extend into a carrier case for make and break contact action therein dependent upon the temperatures to which the thermostat is subjected. Patent No. 2,497,397 shows a similar thermostat having only one bi-metal strip or arm therein.

In many instances, it has been necessary to provide two thermostats, such as have been shown in such patents, or to use pairs of thermostats of other constructions in order to provide thermostatic control of a pair of circuits wherein different operating conditions are to be set up at two different operating temperatures.

In many instances, where thermostats are used, size is of great importance in that the articles are used with small electric appliances, for example, and in general, it is necessary that the thermostats be as small as is practical, but yet give desirable and accurate temperature control for the circuits involved.

Inasmuch as costs are always a factor in the production of any item, and because several thermostats may be used in a number of articles, it is very important that the cost of thermostats be held to a minimum, but that such cost not be reduced or lowered by sacrifice of any quality in the control action of the thermostat.

The general object of the present invention is to provide a novel and improved thermostat having a conductive casing in the thermostat circuit and characterized by the provision of a pair of thermostat control arms in a single unit, which arms can connect to and control different electric circuits at the same or different operating temperatures, as desired.

A further object of the invention is to include a pair of thermostat arms that can be individually calibrated for operative engagement with a common conductor member within a thermostat case whereby two electrical circuits can be controlled by a single thermostat unit.

Another object of the invention is to provide a thermostat having a pair of temperature calibratable arms therein operatively associated with a common contact positioned on and connected to a conductive casing so that a pair of circuits can be controlled by the thermostat at different operative temperatures.

Further objects of the invention are to provide a compact thermostat adapted for dual calibration and control of a pair of circuits with a minimum of variation from similar thermostats having only a single calibration and circuit control action at a minimum change of manufacturing procedures and of thermostat sizes; and to provide a novel dual calibration thermostat unit with a conductive case.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

Figure 1:
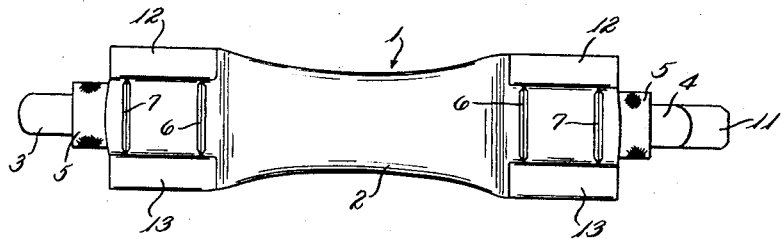
Fig. 1 is an enlarged plan view of a novel dual calibration thermostat embodying the principles of the invention.
Figure 2:
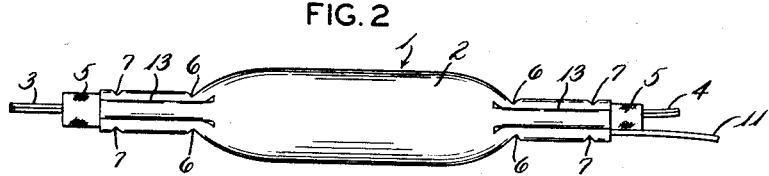
Fig. 2 is a side elevation of the thermostat unit of Fig. 1.

The present invention, generally speaking, relates to a dual calibration thermostat comprising a conductive casing, different bi-metal strips secured to said casing at each end thereof by compressed sections of the casing determining the calibration setting of the individual bi-metal strips, each of said bi-metal strips having a cantilever section extending into the casing from the secured portion thereof and being insulated from the casing, contact means usually carried by each of the bi-metal strips in the cantilever sections thereof and protruding therefrom in the same direction, a contact member secured to and extending into the casing at a point adjacent and axially overlapping the contact means on the bi-metal strips to make and break circuits therewith dependent upon the positions of such bi-metal strips which are controlled by the temperature conditions to which the thermostat is subjected. A lead operatively connects to said contact member normally through the conductive casing.

Reference now is directed particularly to the details of the structure shown in the drawing, and a thermostat 1 of the invention is indicated and illustrates the currently preferred embodiment of the principles of the invention. This thermostat 1 includes a casing 2 that is formed from any suitable conductive material such as copper, aluminum, brass, or the like, and usually is of cylindrical or oval shape in section. A pair of bi-metal control or contact strips 3 and 4 are present in the unit and are of substantially conventional construction for control strips as used in thermostats made at this time. Such strips have the facility of bending from straight form to a curve in a predetermined direction a set amount under predetermined ambient temperature conditions.

It will be seen that each of these bi-metal strips 3 and 4 extends into the causing 2 from one end of the casing and with the bi-metal strips 3 and 4 being insulated from the casing by conventional means, such as baked silicon-impregnated glass fiber insulation spacers, or sleeves 5. Such spacers or sleeves are clamped around the bi-metal strips 3 and 4 by means of transversely directed, axially spaced stakes or notches 6 and 7 formed in flattened portions of the ends of the casing 2 so as to grip the bi-metal strips 3 and 4 tightly and secure them in desired cantilevering positions within the casing 2. The cantilever lengths of the strips 3 and 4 may be about equal, as shown, or they may be of different lengths as desired. These stakes or notches 6 and 7, in combination with flattened lands 12 and 13 formed in the casing 2 at the sides of the bi-metal strips, effectively and tightly anchor or secure end portions of the bi-metal strips in desired positions extending into the casing 2. As explained in the said patents referred to hereinabove, the setting or effective temperatures at which such bi-metal strips 3 and 4 make and break contacts with another member in the thermostat 1 can be effectively calibrated, or controlled. Hence, a dual calibration thermostat is provided by the present invention. At the same time, the casing 2 and elements received therein are of generally the same size and shape, and certainly are of the same overall size as some single calibration and one circuit control thermostats that have been made heretofore.

Any desired types of contacts 8 and 9 are secured, as by spot welding, or by other suitable action, to the bi-metal strips 3 and 4 adjacent the ends of the cantilever sections thereon so that arcuate movement of the cantilever section of the bi-metal strips will bring such contacts into engagement with other means as described hereinafter for make and break action of electrical circuits to be controlled.

The bi-metal strips 3 and 4 naturally protrude from the end of the insulation 5 for engagement with suitable leads connecting the thermostat 1 to the electrical circuits to be controlled.

Figure 3:
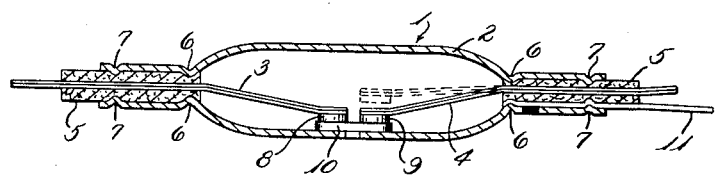
Fig. 3 is a vertical section through the novel thermostat unit of Figs. 1 and 2 and with one bi-metal strip being indicated in its circuit open position.

As an important feature and element of the present invention, a contact 10 is secured to (and extends within) the casing 2 by spot welding, riveting, or other similar action. Fig. 3 of the drawing best shows that the contact 10 axially overlaps the contacts 8 and 9 so that the contact 10 can engage the contacts 8 and 9, respectively, for making and breaking electrical circuits with the leads, or other elements connecting to the bi-metal control strips 3 and 4.

The contact 10 preferably connects through the electrically conductive casing 2 to a terminal lead 11 secured to the casing, as by spot welding, at one end thereof. Hence the thermostat casing usually forms part of the controlled circuits. Obviously the contact 10, as well as the contacts 8 and 9, may be of any conventional design and may have either flat disc-like faces, or may be of a convex shape, or all contacts can be flat, or rounded, as desired.

It should be realized that in some instances, it may be possible to make the casing of the thermostat of the invention from non-conductive material and especially in such instances the bi-metal strips would not necessarily have to be insulated therefrom and the lead would be secured to the contact 10 on the outer surface of the casing. It is within the scope of the present invention to use any suitable type of an operable control arm in lieu of the bi-metal strips referred to herein to provide the desired movement or control action in the thermostat by change of position of such arm dependent upon the temperature conditions to which the thermostat is subjected.

While the present invention shows the use of a specific or extra contact means on the bi-metal strips used in the thermostat, in some instances it may be satisfactory to use integral portions of such strips, or replacements therefor for the actual contact sections in the thermostat.

The casing 2 may be of a sealed construction, or it may have holes therein dependent upon the operating conditions for the thermostat.

Figure 4:
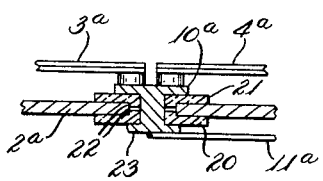
Fig. 4 is a fragmentary vertical section of a modification of the invention.

In a modified thermostat shown in Fig. 4, a casing 2a is shown having bi-metal strips 3a and 4a positioned therein. A contact 10a is secured to the casing 2a and extends through a hole in the casing. Suitable means, such as porcelain discs 20 and 21, or similar insulation members, insulate the contact 10a from the casing. Necks 22 are provided on the discs 20 and 21 to extend into the hole in the casing 2a. The outer end 23 of the contact 10a is peened over or otherwise secured to the assembly to hold the discs 20 and 21 and contact 10a in position. A lead 11a is suitably welded to, or engaged with the contact end 23 so that a center lead is provided and the casing 2a does not carry any electrical current or voltage. Such lead 11a may even be secured to the inner end of the contact, or contact member 10a and extend out through suitable insulation at one end of the casing 2a.

The bi-metal strips used in a thermostat may be of different sizes and electrical and thermal characteristics.

In use, the thermostats of the invention usually have a thin insulating tube of mica, or other suitable material, placed therearound.

It should be noted that this new dual calibration thermostat of the invention permits sensing of temperature at the same physical point in any appliance, electrical coil, or other device where either the temperature pickup for operating reasons, or physical space or installation reasons, do not permit the installation of two separate thermostats irrespective of cost or other factors involved in the design of the article.

Likewise, the dual calibration feature in a single very compact tubular thermostat, without adjustment screws, provides an extra and very vital and important temperature safety factor for operating reasons when used in series in a single circuit.

For example, one bi-metal strip may be calibrated to open at 150° C., and the other at 160° C. When used as a safety device for maximum temperature control in an electrical device, coil, electric motor, electronic equipment, or the like, if the 150° C. protective thermostat should begin to fail, or actually fail to operate after continuous current load and operation, the 160° C. thermostat would then begin to operate and cycle under heat or current impulses so that the maximum temperature attained would not exceed the second maximum temperature limit of 160° C. Without the second safety control circuit within the same thermal protective device, substantial loss or destruction of the equipment by fire or overheating would have occurred.

This second or dual safety control circuit is of exceptional importance where there are requirements of absolutely maximum safety in temperature control for valuable equipment, or where standards organizations, such as Underwriters' Laboratories, insist upon several weeks of safety control at maximum temperatures, and such standards are beyond the operating life potential of a single protective thermal device within permissible external physical dimensions. This dual protective design of the thermostats of the invention therefore permits protective operation far beyond the performance of a prior type single calibration thermostat. This is especially true in compact technical and electronic installations where very small size and weight are vital, and in commercial equipment, such as electric motors and stator coils, where dimensional limits and installation space is very limited. Hence size of a thermostat and the control action effected are very important factors in the selection and use of thermostats. Thermostats of the invention have been made and used where the unit has been 1.0 inch long and .20 inch thick.

From the foregoing, it will be seen that a novel, improved type of a thermostat has been provided by the invention. This thermostat is of compact size and has a minimum of deviation from the manufacturing and production operations used in making prior types of single circuit control thermostats. This improved thermostat will effectively control the operation of a pair of circuits and the different bi-metal strips of the thermostat can readily be calibrated to make or break contacts at different operative temperature conditions. Hence, it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

I claim:

1. A dual calibration thermostat comprising an electrically conductive hollow casing, different bi-metal strips individually secured to said casing at each end thereof and each having a cantilever section extending into said casing from the secured portion thereof, said bi-metal strips being insulated from said casing and terminating in adjacent but axially spaced relation, contact means secured to each of said bi-metal strips at the cantilever sections thereof and extending in the same direction, and a contact member fixedly secured to said casing and extending into the bore thereof, said contact member being positioned adjacent said contact means and being of a size for engaging both of said contact means on said bi-metal strips simultaneously to make and break individual circuits therewith dependent upon the positions of said bi-metal strips, and said bi-metal strips being individually calibratable by pairs of transversely extending axially spaced stake-like areas at each end of said casing where said bi-metal strips are secured to said casing.

2. A dual calibration thermostat comprising an electrically conducitve hollow casing, different bi-metal strips individually secured to said casing at each end thereof and having cantilever sections extending into said casing from the secured portion thereof, said bi-metal strips being insulated from said casing and terminating in adjacent but axially spaced relation, contact means secured to each of said bi-metal strips at the cantilever sections thereof and extending in the same direction, and a contact member fixedly secured to said casing and extending into the bore thereof, said contact member being positioned adjacent said contact means for engaging both of said contact means on said bi-metal strips simultaneously to make and break individual circuits therewith dependent upon the positions of said bi-metal strips.

3. A dual calibration thermostat comprising a hollow casing, different bi-metal control strips individually secured to said casing at each end thereof and each having a cantilever section extending into said casing from the secured portion thereof, said bi-metal control strips terminating in adjacent but axially spaced relation and being connectable to two different circuits, contact means secured to each of said bi-metal control strips at the cantilever sections thereof and extending in the same direction, a contact member secured to said casing and extending into the bore thereof, said contact member being positioned adjacent said contact means for engaging said contact means on said bi-metal control strips to make and break circuits therewith dependent upon the positions of said bi-metal strips, and a lead operatively connected to said contact member for connection to the two different circuits of said control strips whereby one thermostat can control two different circuits.

4. A dual calibration thermostat comprising an electrically conductive hollow casing, different control strips individually secured to said casing at each end thereof and each having a cantilever section extending into said casing from the secured portion thereof, said control strips being insulated from said casing and terminating in adjacent but axially spaced relation, contact means secured to each of said control strips at the cantilever sections thereof and extending in the same direction, and a contact member fixedly secured to said casing to make electric contact therewith and extending into the bore thereof, said contact member being positioned adjacent said contact means for engaging said contact means on said control strips to make and break circuits therewith dependent upon the positions of said control strips, and a lead secured in electrically conductive relation to said casing and extending therefrom for connection to the individual circuits of said control strips.

5. A dual calibration thermostat comprising a hollow casing, different bi-metal strips individually secured to said casing at each end thereof and each having a cantilever section extending into said casing from the secured portion thereof, said bimetal strips being connectable by different circuits for control action therein, said bi-metal strips being insulated from said casing and terminating in adjacent but axially spaced relation, contact means secured to each of said bi-metal strips at the cantilever sections thereof and extending in the same direction, a contact member extending through a wall of said casing and secured to and intermediate the ends thereof and extending into the bore thereof, said contact member being positioned adjacent said contact means and presenting sufficient areas for simultaneously engaging both of said contact means on said bi-metal strips to make and break individual circuits therewith dependent upon the positions of said bi-metal strips, said bi-metal strips being individually calibratable by pairs of transversely extending axially spaced stake-like areas at each end of said casing where said bi-metal strips are secured to said casing, means insulating said contact member from said casing, and a lead secured to the outer portion of said contact member.

6. A dual calibration thermostat comprising a hollow casing, different bi-metal strips individually secured to said casing at each end thereof and each having a cantilever section extending into said casing from the secured portion thereof, said bi-metal strips being insulated from said casing and terminating in adjacent but axially spaced relation, contact means secured to each of said bi-metal strips at the cantilever sections thereof and extending in the same direction, a contact member extending through and secured to a wall of said casing intermediate the ends thereof and extending into the bore thereof, said contact member being positioned adjacent said contact means and having an exposed area within said casing for engaging both of said contact means on said bi-metal strips simultaneously to make and break individual circuits therewith dependent upon the positions of said bi-metal strips and to control two circuits connected thereto, and means insulating said contact member from said casing.

References Cited in the file of this patent

UNITED STATES PATENTS

| | | |
|---|---|---|
| 1,803,203 | Nelson | Apr. 28, 1931 |
| 2,279,929 | Schoumaker | Apr. 14, 1942 |
| 2,423,197 | Matson | July 1, 1947 |
| 2,497,397 | Dales | Feb. 14, 1950 |
| 2,586,309 | Dales | Feb. 19, 1952 |

FOREIGN PATENTS

| | | |
|---|---|---|
| 316,741 | Great Britain | Aug. 8, 1929 |